(12) United States Patent
Xiang

(10) Patent No.: US 9,565,259 B2
(45) Date of Patent: Feb. 7, 2017

(54) METHOD AND APPARATUS FOR OUTPUTTING RECOGNIZABLE IDENTIFIER

(71) Applicant: Tencent Technology (Shenzhen) Company Limited, Shenzhen (CN)

(72) Inventor: Guoyi Xiang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/187,561

(22) Filed: Jun. 20, 2016

(65) Prior Publication Data

US 2016/0301760 A1 Oct. 13, 2016

Related U.S. Application Data

(63) Continuation of application No. PCT/CN2014/088934, filed on Oct. 20, 2014.

(30) Foreign Application Priority Data

Apr. 3, 2014 (CN) .......................... 2014 1 0134624

(51) Int. Cl.
*G06F 17/00* (2006.01)
*H04L 29/08* (2006.01)
(Continued)

(52) U.S. Cl.
CPC ........... *H04L 67/146* (2013.01); *G06F 3/0485* (2013.01); *G06F 3/0488* (2013.01);
(Continued)

(58) Field of Classification Search
CPC . G06F 3/0482; H04M 1/72583; H04W 4/001; H04W 4/02; H04W 4/021; H04W 8/005; H04W 8/26
(Continued)

(56) References Cited

U.S. PATENT DOCUMENTS 8,554,763 B2  10/2013 Jeon
8,977,947 B2 *  3/2015 Melton ............ G06F 17/30719
                                             715/206
(Continued)

FOREIGN PATENT DOCUMENTS

KR       20090072772 A       7/2009

OTHER PUBLICATIONS

Tencent Technology, ISRWO, PCT/CN2014/088934, Jan. 20, 2015, 6 pgs.
(Continued)

*Primary Examiner* — Seung Lee
(74) *Attorney, Agent, or Firm* — Morgan, Lewis & Bockius LLP

(57) ABSTRACT

A method of generating a recognizable identifier for a network address includes at a portable computer device having one or more processors and memory storing programs executed by the one or more processors, touching an image icon on an application interface displayed on a screen of the portable computer device; acquiring a network address of the application interface; generating a recognizable identifier that represents the network address; generating a mask layer of the application interface; and displaying the recognizable identifier on the mask layer, wherein the mask layer of the application interface is configured to cover the application interface.

18 Claims, 8 Drawing Sheets

(51) Int. Cl.
    *G06F 17/30*     (2006.01)
    *G06F 11/36*     (2006.01)
    *G06F 3/0481*     (2013.01)
    *G06F 3/0485*     (2013.01)
    *G06F 3/0488*     (2013.01)
    *G06K 7/14*     (2006.01)
    *G06K 19/06*     (2006.01)

(52) U.S. Cl.
    CPC ...... *G06F 3/04817* (2013.01); *G06F 11/3668* (2013.01); *G06F 17/30879* (2013.01); *G06K 7/1417* (2013.01); *G06K 19/06037* (2013.01); *H04L 67/02* (2013.01)

(58) Field of Classification Search
    USPC .......................................... 235/375, 462.15
    See application file for complete search history.

(56) References Cited

U.S. PATENT DOCUMENTS

2004/0087273 A1     5/2004   Perttila et al.
2015/0134436 A1*   5/2015   Lambert ............ G06Q 20/3274
                                             705/14.26

OTHER PUBLICATIONS

Tencent Technology, IPRP, PCT/CN2014/088934, Oct. 4, 2016, 4 pgs.

* cited by examiner

METHOD AND APPARATUS FOR OUTPUTTING RECOGNIZABLE IDENTIFIER

RELATED APPLICATIONS

This application is a continuation application of PCT Patent Application No. PCT/CN2014/088934, entitled "METHOD AND APPARATUS FOR OUTPUTTING RECOGNIZABLE IDENTIFIER" filed on Oct. 20, 2014, which claims priority to Chinese Patent Application No. 201410134624.2, entitled "Method and Apparatus for Outputting Recognizable Identifier" filed on Apr. 3, 2014, both of which are incorporated by reference in their entirety.

TECHNICAL FIELD

The present application relates to the field of internet communication technologies, and in particular, to a method and a system of generating a recognizable image for a network address.

BACKGROUND

As the mobile internet technology advances, application developers have begun researching and developing applications that are related to the internet browser used in the mobile terminal device. A typical procedure to develop and test a newly developed webpage includes: developing a webpage on a desktop or a server computer, logging in the webpage using a mobile terminal device, and testing the webpage functions using the mobile terminal device. If a problem is discovered, the network address of the webpage needs to be manually input to the browser of the mobile terminal device. To avoid mistakes in the manual input and to save time, application developers transform the network address of the webpage into a two-dimensional code using a software tool, take a picture of the two-dimensional code, and scan the two-dimensional code to access the webpage to be tested.

As a webpage includes a plurality of links directing to various pages and contents, each time a problem is discovered in a new webpage, application developers need to use the software tool installed on a desktop or a server computer to manually transform the network address of the webpage into a two-dimensional code. Therefore, the current technology of generating a two-dimensional code that representing a network address is inefficient and expensive.

SUMMARY

In accordance with some implementations of the present application, a method of generating a recognizable identifier for a network address includes at a portable computer device having one or more processors and memory storing programs executed by the one or more processors, detecting that an image icon on an application interface displayed on a screen of the portable computer device has been touched; acquiring a network address of the application interface; generating a recognizable identifier that represents the network address; generating a mask layer of the application interface; and displaying the recognizable identifier on the mask layer, where the mask layer of the application interface is configured to cover the application interface.

In accordance with some implementations, the method of generating a recognizable identifier for a network address further comprises displaying a notification message on the mask layer, wherein the notification message is configured to notify a user to scan the recognizable identifier using the portable computer device.

In accordance with some implementations, the mask layer is configured with a preset transparency.

In accordance with some implementations, the image icon is displayed at a preset position on the application interface.

In accordance with some implementations, the method of generating a recognizable identifier for a network address further comprises generating a frame layer of the application interface that covers borders of the application interface, where the image icon is displayed at a preset position on the frame layer of the application interface.

In accordance with some implementations, the recognizable identifier that represents the network address is configured to be one of a two-dimensional code, a barcode, and a three-dimensional code.

In accordance with some implementations of the present application, a system of generating a recognizable identifier for a network address comprises one or more processors; memory; and one or more programs stored in the memory and configured for execution by the one or more processors, the one or more programs including instructions for: detecting that an image icon on an application interface displayed on a screen of the portable computer device has been touched; acquiring a network address of the application interface; generating a recognizable identifier that represents the network address; generating a mask layer of the application interface; and displaying the recognizable identifier on the mask layer, where the mask layer of the application interface is configured to cover the application interface.

In accordance with some implementations of the present application, a non-transitory computer readable storage medium, storing one or more programs for execution by one or more processors of a system of generating a recognizable identifier for a network address including instructions for: detecting that an image icon on an application interface displayed on a screen of the portable computer device has been touched; acquiring a network address of the application interface; generating a recognizable identifier that represents the network address; generating a mask layer of the application interface; and displaying the recognizable identifier on the mask layer, where the mask layer of the application interface is configured to cover the application interface.

BRIEF DESCRIPTION OF THE DRAWINGS

The aforementioned features and advantages of the present application as well as additional features and advantages thereof will be more clearly understood hereinafter as a result of a detailed description of preferred embodiments when taken in conjunction with the drawings.

To illustrate the technical solutions according to the embodiments of the present application or in the prior art more clearly, the accompanying drawings required for describing the embodiments or the prior art are introduced below briefly. As should be apparent, the accompanying drawings in the following descriptions merely show some of the embodiments of the present application, and a person of ordinary skill in the art can obtain other drawings according to the accompanying drawings without creative efforts.

FIG. 4-1 is an exemplary webpage interface before a frame layer is displayed according to an embodiment of the present application;

FIG. 4-2 is an exemplary webpage interface after a frame layer is displayed according to an embodiment of the present application;

FIG. 6-1 is an exemplary webpage interface of an application interface according to an embodiment of the present application;

FIG. 6-2 is an exemplary webpage interface displaying a mask layer over the application interface according to an embodiment of the present application;

FIG. 7-1 is an exemplary webpage interface of an application interface according to another embodiment of the present application;

FIG. 7-2 is an exemplary webpage interface displaying a mask layer over the application interface according to another embodiment of the present application;

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The technical solutions of the present application will be clearly described below with reference to the accompanying drawings. It is obvious that embodiments to be described are only a part rather than all of the embodiments of the present application. All other embodiments obtained by a person of ordinary skill in the art based on the embodiments of the present application without creative efforts shall fall within the protection scope of the present application.

Figure 1:
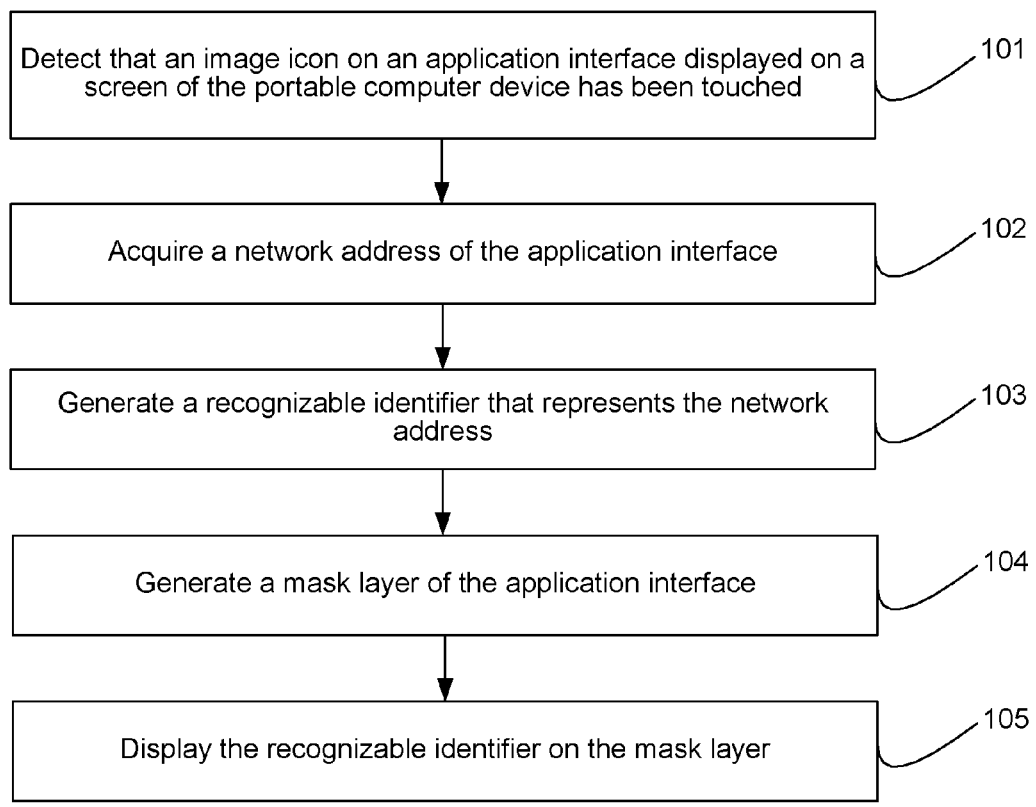
FIG. 1 is an exemplary embodiment of a method of generating a recognizable image for a network address according to the present application.

FIG. 1 is an exemplary embodiment of a method of generating a recognizable image for a network address according to the present application.

At step 101, when a user touches an image icon on an application interface displayed on a screen of the portable computer device, the computer device detects the touch. In some embodiments, the application corresponding to the application interface may be an internet browser embedded in the portable computer device. Yet in some other embodiments, the application may be a file editing application, a multimedia player, etc.

At step 102, a network address of the application interface is acquired. Acquiring the network address of the application interface may be triggered by finger touching the area of the image icon, or clicking the area using a mouse. For example, a newly developed webpage that needs to be tested has an address of www.xxx.com/wangzhan/test1.html, and a file that needs to be edited has an address of www.xxx.com/document/test1.tex.

At step 103, a recognizable identifier that represents the network address is generated. In some embodiments, the recognizable identifier may be a two-dimensional code, a barcode, or a three-dimensional code generated by a coding computation performed in the portable computer device. As the portable computer device is installed with identifier recognition software, the recognizable identifier can be interpreted into the network address for the user to access.

At step 104, a mask layer of the application interface is generated. In some embodiments, the mask layer may be configured to cover a partial or entire area of the application interface. Further, the mask layer may be configured with colors such as gray or white, etc., and with a preset transparency such as non transparency, or half transparency, etc.

At step 105, the recognizable identifier is displayed on the mask layer. In some embodiments, the mask layer may be configured to be larger than the recognizable identifier, and the recognizable identifier may be displayed in the center of the mask layer. In some embodiments, the brightness of the mask layer may be adjusted in order to clearly show the recognizable identifier.

In some embodiments, the image icon on the application interface is not shown when the recognizable identifier is displayed on the mask layer; yet in some other embodiments, the image icon on the application interface remains shown when the recognizable identifier is displayed on the mask layer.

When the mask layer covers the application interface, displaying the recognizable identifier on a mask layer facilitates the scanning of the identifier using the portable computer device. In other words, the recognition accuracy of the recognizable identifier may be improved when the mask layer covers the application interface.

Figure 2:
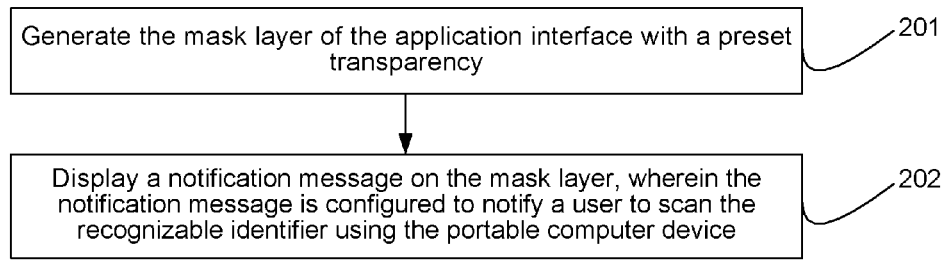
FIG. 2 is another exemplary embodiment of a method of generating a recognizable image for a network address according to the present application.

FIG. 2 is another exemplary embodiment of a method of generating a recognizable image for a network address according to the present application.

At step 201, the mask layer of the application interface is generated with a preset transparency. The preset transparency may be configured to be any number between 0 and 1, where 0 indicates non transparency and 1 indicates full transparency.

At step 202, a notification message is displayed on the mask layer to notify a user to scan the recognizable identifier using the portable computer device. For example, the notification message may be "scan the two-dimensional code to enter the website" or "scan the two-dimensional code to open the text file."

Figure 3:
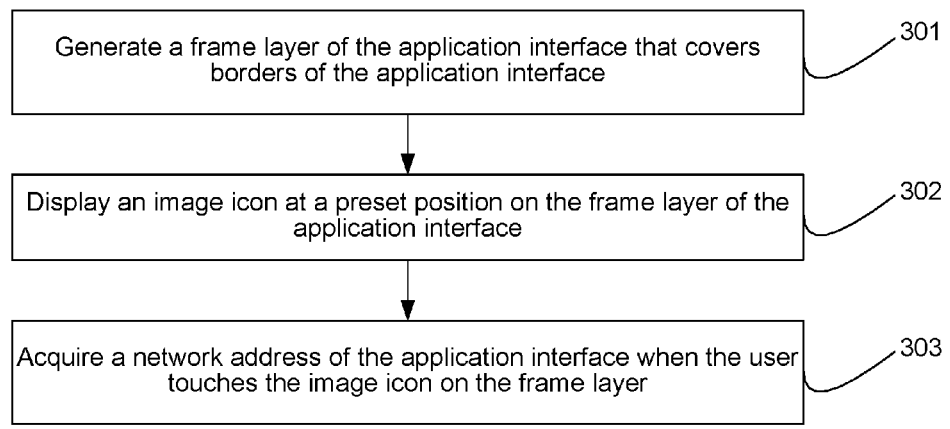
FIG. 3 is yet another exemplary embodiment of a method of generating a recognizable image for a network address according to the present application.

FIG. 3 is yet another exemplary embodiment of a method of generating a recognizable image for a network address according to the present application.

At step 301, a frame layer of the application interface that covers borders of the application interface is generated. In some embodiments, the mask layer may be configured to display within an area encompassed by the frame layer.

At step 302, the image icon is displayed at a preset position on the frame layer of the application interface. In some embodiments, the preset position may be the upper left corner, the upper right corner, the bottom left corner, the bottom right corner, or the frames of the frame layer.

At step 303, a network address of the application interface is acquired when the user touches the image icon on the frame layer.

Figures 1, 4:
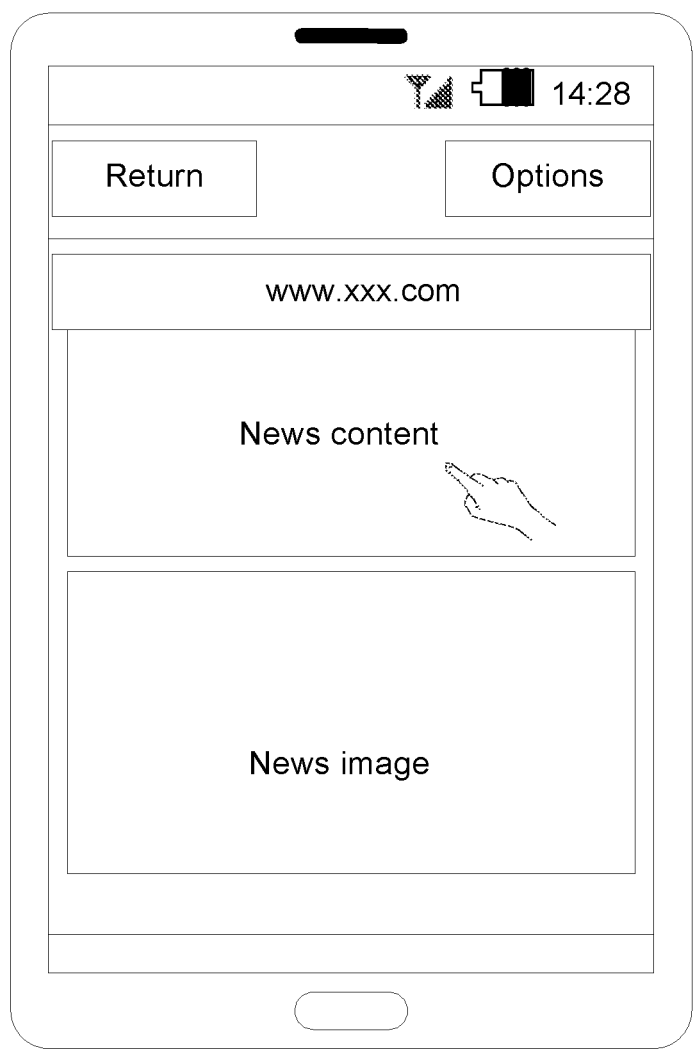
Figures 2, 4:

FIG. 4-1 is an exemplary webpage interface before a frame layer is displayed according to an embodiment of the present application, and FIG. 4-2 is an exemplary webpage interface after a frame layer is displayed according to an embodiment of the present application.

As shown in FIG. 4-1, a user is visiting a website at www.xxx.com using an embedded browser of a portable computer device. The touch screen of the portable computer device may sense the user's finger movement on the screen to open a new page, scroll up and down the screen, and other operations etc. When the user touches the "News content" of the current interface, a frame layer is displayed over the current interface and covers the borders of the current interface, as shown in FIG. 4-2.

In some embodiments, the frame layer may be configured to display browsing shortcuts such as forward, backward, refresh, etc.

In some embodiments, the frame layer may be further configured to display an image icon at a preset position, for example, at the upper right corner. Touching the image icon may trigger acquiring the network address for the current interface of the application.

Figure 5:
FIG. 5 is an exemplary webpage interface for displaying a mask layer within an area encompassed by the frame layer according to an embodiment of the present application.

FIG. 5 is an exemplary webpage interface for displaying a mask layer within an area encompassed by the frame layer according to an embodiment of the present application. As shown in FIG. 5, when a user touches the image icon at the upper right corner of the frame layer in FIG. 4-2, a mask layer may be displayed over the current interface, and the mask layer is configured to cover an area of the current interface encompassed by the frame layer.

In some embodiments, the mask layer is configured with a preset transparency. In FIG. 5, the mask layer is configured with a transparency of 0, i.e., non-transparent. Yet in some other embodiments, the transparency of the mask layer may be any number between 0 and 1, where 0 indicates non-transparent and 1 indicates full-transparent.

In some embodiments, when the mask layer is revoked by the user, the frame layer may also be revoked. In other embodiments, when the mask layer is revoked by the user, the frame layer may remain displayed over the current interface.

In some embodiments, only when the image icon at the upper right corner (for example) of the frame layer is touched by the user, the mask layer is generated and displayed. Finger operations on the touch screen, such as scrolling up and down the page, may not trigger the mask layer to be generated. Therefore, it is convenient for the user of a portable computer device to operate on the small screen where the current User Interface (UI) is efficiently designed and organized.

Figures 1, 6:
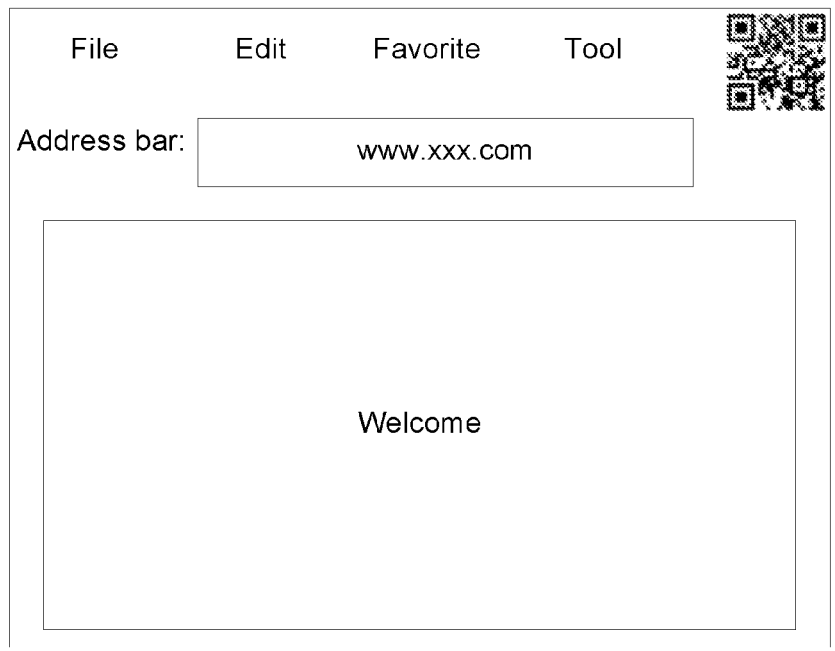
Figures 2, 6:
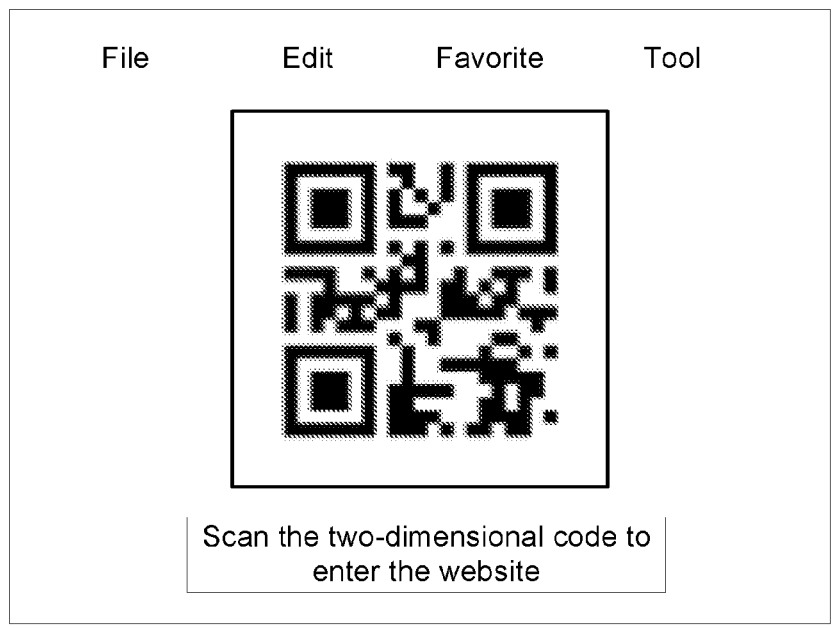

FIG. 6-1 is an exemplary webpage interface of an application interface according to an embodiment of the present application. FIG. 6-2 is an exemplary webpage interface displaying a mask layer over the application interface according to an embodiment of the present application.

FIG. 6-1 shows a welcome page of a website www.xxx.com displayed on a portable computer device. The welcome page has an image icon displayed on the upper right corner of the current interface. When the mouse is moved to the area of the image icon, a mask layer may be displayed, and may cover the entire interface of the browser, as shown in FIG. 6-2. A two-dimensional code that represents the network address of the webpage displayed in the browser may be displayed on the mask layer. Further, a notification message of "scan the two-dimensional code to enter the website" may be displayed on the bottom of the mask layer. The user can scan the two-dimensional code using the portable computer device to directly log in the webpage.

Figures 2, 7:
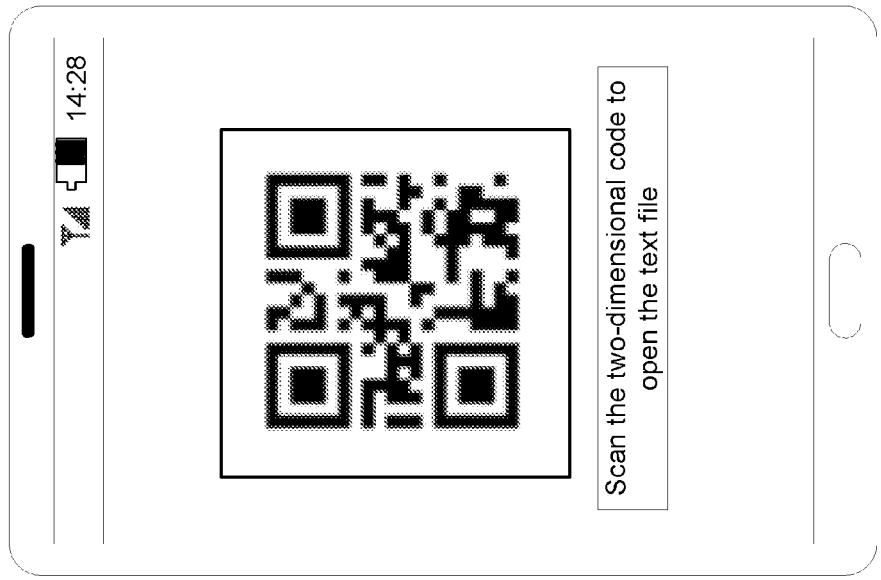
Figures 1, 7:
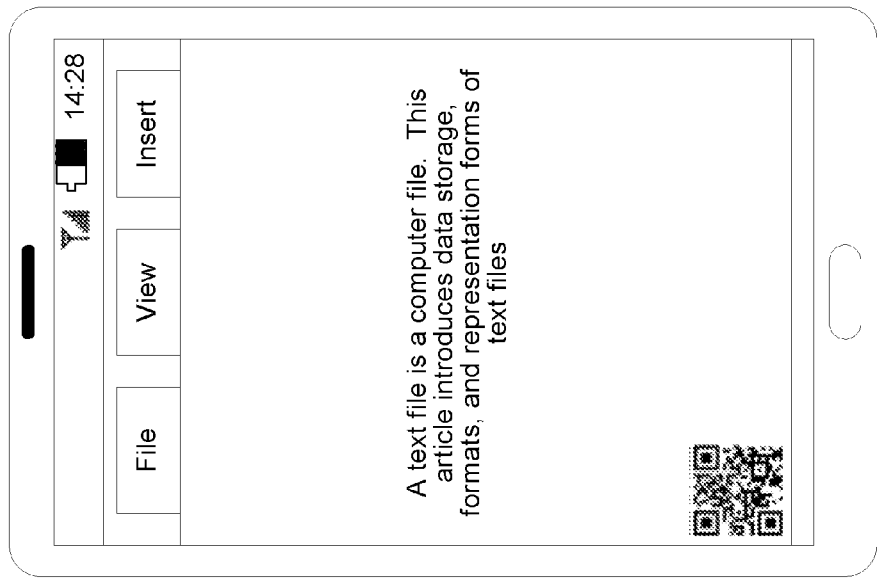

FIG. 7-1 is an exemplary webpage interface of an application interface according to another embodiment of the present application. FIG. 7-2 is an exemplary webpage interface displaying a mask layer over the application interface according to another embodiment of the present application.

As shown in FIG. 7-1, an application of document editing is launched on the portable computer device. The application interface may include contents of a file, view tab, insert tab, and an image icon located on the bottom left corner of the interface. When the user touches an area of the image icon, a mask layer that covers the entire application interface may be displayed, as shown in FIG. 7-2. A two-dimensional code that represents the network address of the opened file may be displayed on the mask layer. Further, a notification message of "scan the two-dimensional code to open the text file" may be displayed on the bottom of the mask layer. The user can scan the two-dimensional code using the portable computer device to directly log in the webpage and open the file.

Figure 8:
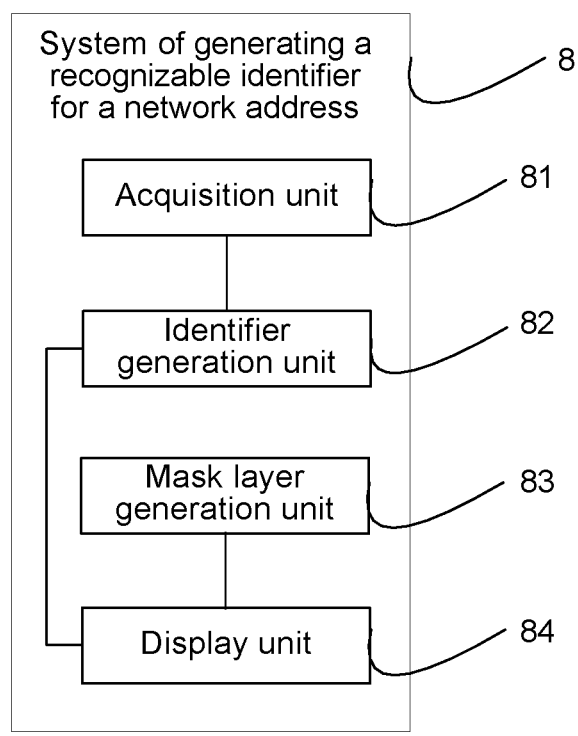
FIG. 8 is an exemplary diagram of a system of generating a recognizable image for a network address according to an embodiment of the present application.

FIG. 8 is an exemplary diagram of a system of generating a recognizable image for a network address according to an embodiment of the present application. The system of generating a recognizable image for a network address may include an acquisition unit 81 configured to acquire the network address of an application interface when a user touches an image icon on the application interface; an identifier generation unit 82 configured to generate a recognizable identifier that represents the network address; a mask layer generation unit 83 configured to generate a mask layer of the application interface, and a display unit 84 configured to display the recognizable identifier on the mask layer.

According to the present application, the acquisition unit 81 may be configured to automatically acquire the network address of a current interface, and send the network address to the identifier generation unit 82 to process. The identifier generation unit 82 may invoke two-dimensional code generation software in the backstage, and generate a recognizable identifier that represents the network address. The display unit 84 may further display the recognizable identifier that represents the network address on the mask layer generated by the mask layer generation unit 83. As the user can scan the recognizable identifier embedded with the network address using the portable computer device to directly visit the webpage, an application developer does not need to turn to a desktop or a server computer to generate the recognizable identifier, i.e., the two-dimensional code, and therefore, facilitating the testing of a newly developed webpage.

In some embodiments, the mask generation unit 83 may be further configured to generate the mask layer of the application interface with a preset transparency.

In some embodiments, the display unit 84 may be further configured to display a notification message on the mask layer to notify a user to scan the recognizable identifier using the portable computer device.

In some embodiments, the display unit 84 may be further configured to display a frame layer of the application interface that covers the borders of the application interface.

In some embodiments, the image icon may be displayed on a preset position of the application interface. Yet in some embodiments, the image icon may be displayed on a preset position of the frame layer of the application interface.

In some embodiments, the recognizable identifier that represents the network address may be configured to be one of a two-dimensional code, a barcode, and a three-dimensional code.

While particular embodiments are described above, it will be understood it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the present application herein is for the purpose of describing particular embodiments only and is not intended to be limiting of the present application. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the present application to the precise forms disclosed. Many modifications and variations are possible in view of the above teachings. The embodiments were chosen and described in order to best explain the principles of the present application and its practical applications, to thereby enable others skilled in the art to best utilize the present application and various embodiments with various modifications as are suited to the particular use contemplated.

What is claimed is:

1. A method of generating a recognizable identifier for a network address comprising:

at a portable computer device having one or more processors and memory storing programs executed by the one or more processors,
    detecting that an image icon on an application interface displayed on a screen of the portable computer device has been touched;
    acquiring a network address of the application interface;
    generating a recognizable identifier that represents the network address;
    generating a mask layer of the application interface; and
    displaying the recognizable identifier on the mask layer,
    wherein the mask layer of the application interface is configured to cover the application interface.

2. The method of generating a recognizable identifier for a network address of claim 1, further comprises:

displaying a notification message on the mask layer, wherein the notification message is configured to notify a user to scan the recognizable identifier using the portable computer device.

3. The method of generating a recognizable identifier for a network address of claim 1, wherein the mask layer is configured with a preset transparency.

4. The method of generating a recognizable identifier for a network address of claim 1, wherein the image icon is displayed at a preset position on the application interface.

5. The method of generating a recognizable identifier for a network address of claim 1, further comprises:

generating a frame layer of the application interface that covers borders of the application interface;
    wherein the image icon is displayed at a preset position on the frame layer of the application interface.

6. The method of generating a recognizable identifier for a network address of claim 1, wherein the recognizable identifier that represents the network address is configured to be one of a two-dimensional code, a barcode, and a three-dimensional code.

7. A system of generating a recognizable identifier for a network address, comprising:

one or more processors;
    memory; and
    one or more programs stored in the memory and configured for execution by the one or more processors, the one or more programs including instructions for:
    detecting that an image icon on an application interface displayed on a screen of the portable computer device has been touched;
    acquiring a network address of the application interface;
    generating a recognizable identifier that represents the network address;
    generating a mask layer of the application interface; and
    displaying the recognizable identifier on the mask layer,
    wherein the mask layer of the application interface is configured to cover the application interface.

8. The system of generating a recognizable identifier for a network address of claim 7, wherein the one or more programs further include instructions for:

displaying a notification message on the mask layer, wherein the notification message is configured to notify the user to scan the recognizable identifier using the portable computer device.

9. The system of generating a recognizable identifier for a network address of claim 7, wherein the mask layer is configured with a preset transparency.

10. The system of generating a recognizable identifier for a network address of claim 7, wherein the image icon is displayed at a preset position on the application interface.

11. The system of generating a recognizable identifier for a network address of claim 7, wherein the one or more programs further include instructions for:
generating a frame layer of the application interface that covers borders of the application interface,
wherein the image icon is displayed at a preset position on the frame layer of the application interface.

12. The system of generating a recognizable identifier for a network address of claim 7, wherein
the recognizable identifier that represents the network address is configured to be one of a two-dimensional code, a barcode, and a three-dimensional code.

13. A non-transitory computer readable storage medium, storing one or more programs for execution by one or more processors of a system of generating a recognizable identifier for a network address including instructions for:
detecting that an image icon on an application interface displayed on a screen of the portable computer device has been touched;
acquiring a network address of the application interface;
generating a recognizable identifier that represents the network address;
generating a mask layer of the application interface; and
displaying the recognizable identifier on the mask layer,
wherein the mask layer of the application interface is configured to cover the application interface.

14. The non-transitory computer readable storage medium of claim 13, wherein the one or more programs including instructions for:
displaying a notification message on the mask layer, wherein the notification message is configured to notify the user to scan the recognizable identifier using the portable computer device.

15. The non-transitory computer readable storage medium of claim 13, wherein
the mask layer is configured with a preset transparency.

16. The non-transitory computer readable storage medium of claim 13, wherein
the image icon is displayed at a preset position on the application interface.

17. The non-transitory computer readable storage medium of claim 13, wherein the one or more programs further include instructions for:
generating a frame layer of the application interface that covers borders of the application interface,
wherein the image icon is displayed at a preset position on the frame layer of the application interface.

18. The non-transitory computer readable storage medium of claim 13, wherein
the recognizable identifier that represents the network address is configured to be one of a two-dimensional code, a barcode, and a three-dimensional code.

* * * * *